Figure 16:
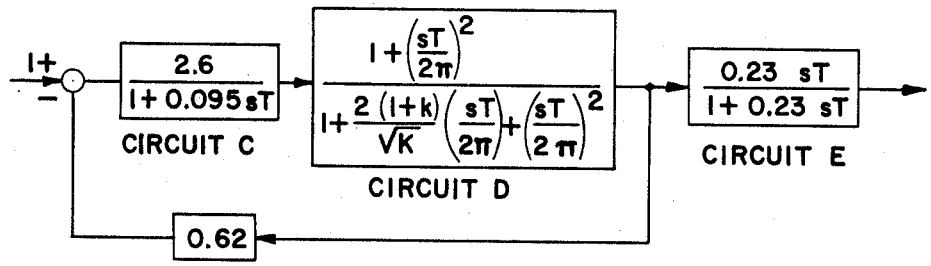

July 21, 1964   O. J. M. SMITH   3,141,982
CONTROL SYSTEM FOR USE IN CONTROL OF LOOPS WITH DEAD TIME
Filed Jan. 6, 1960   6 Sheets-Sheet 1
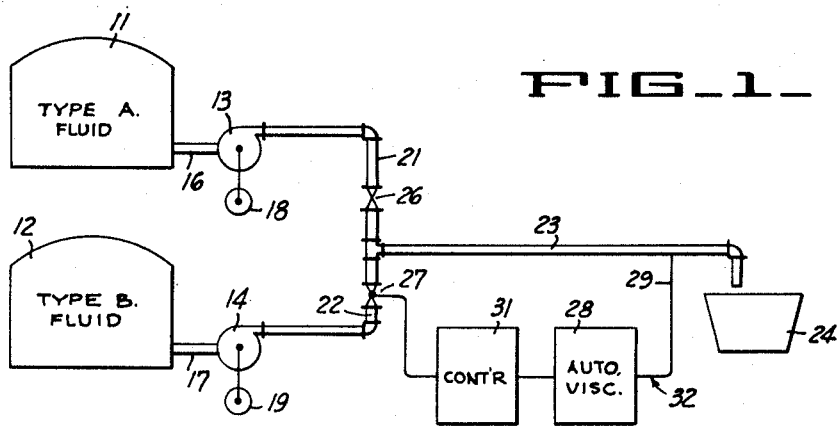
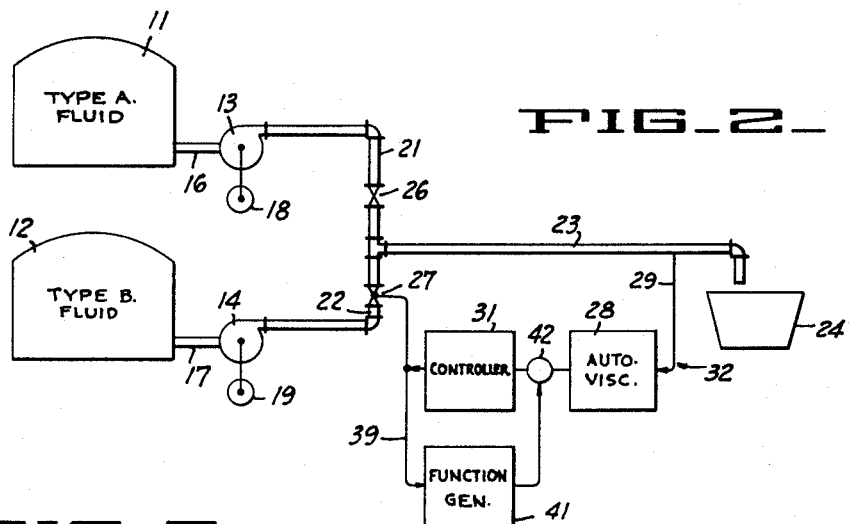
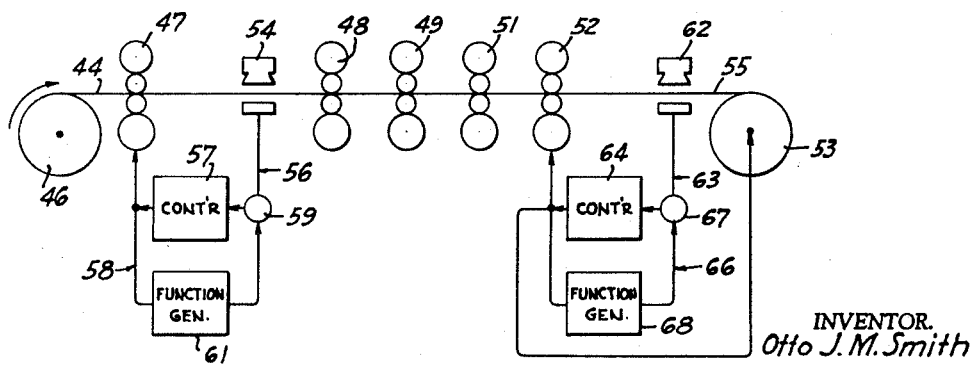
INVENTOR.
Otto J. M. Smith
BY
ATTORNEYS July 21, 1964   O. J. M. SMITH   3,141,982
CONTROL SYSTEM FOR USE IN CONTROL OF LOOPS WITH DEAD TIME
Filed Jan. 6, 1960   6 Sheets-Sheet 2
FIG_4_
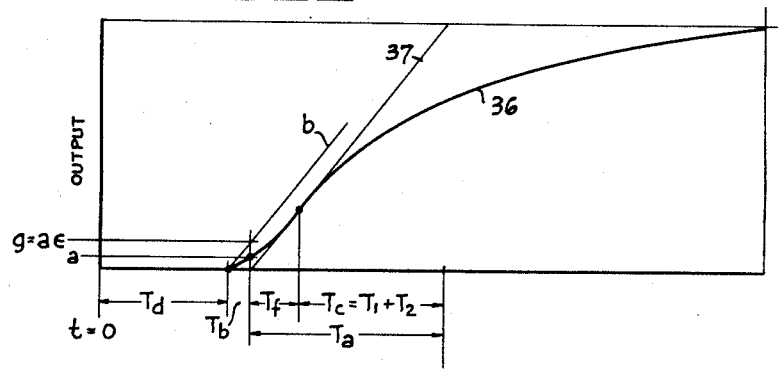
FIG_5_
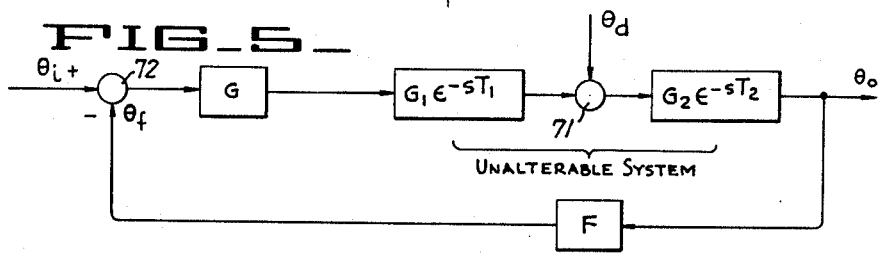
FIG_6_
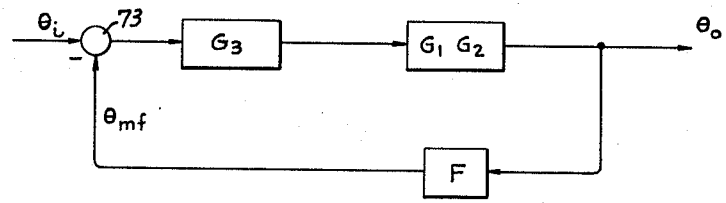
FIG_7_
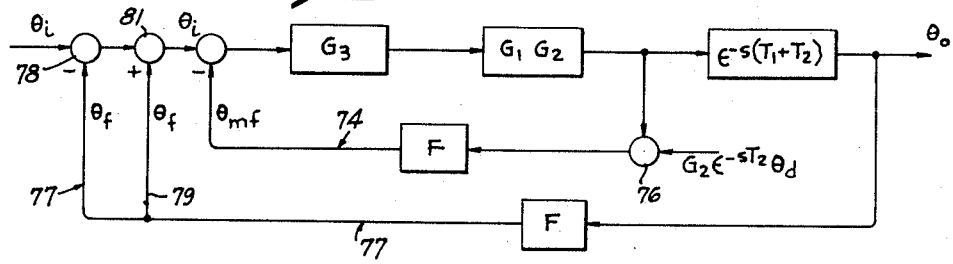
INVENTOR.
Otto J. M. Smith
BY
ATTORNEYS July 21, 1964     O. J. M. SMITH     3,141,982
CONTROL SYSTEM FOR USE IN CONTROL OF LOOPS WITH DEAD TIME
Filed Jan. 6, 1960     6 Sheets—Sheet 3
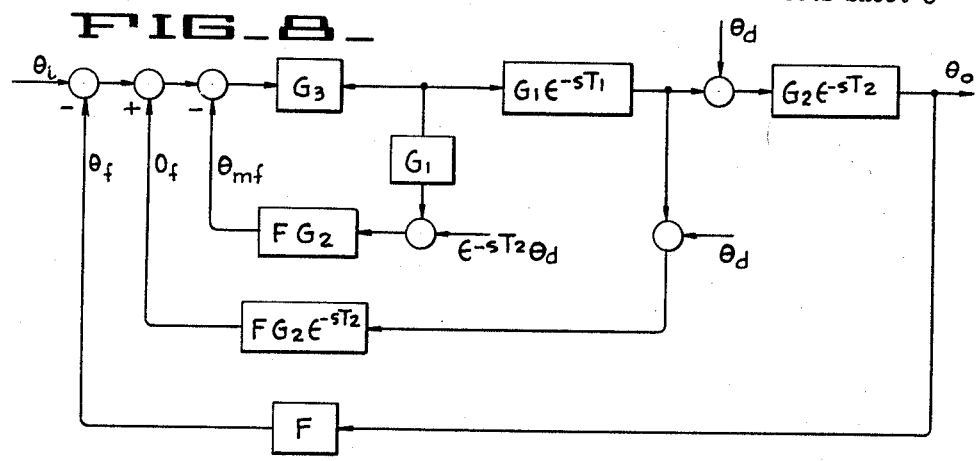
FIG_8_
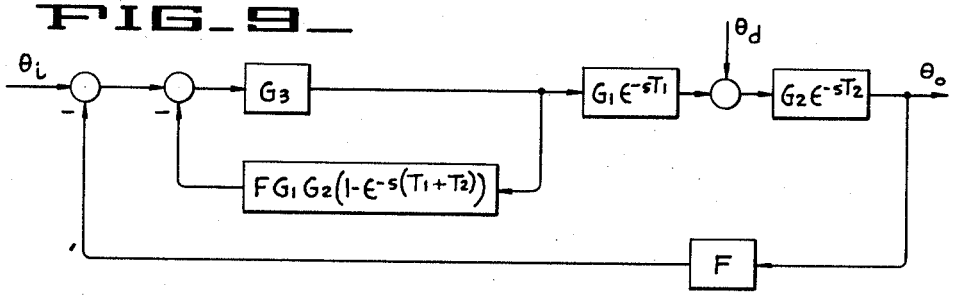
FIG_9_
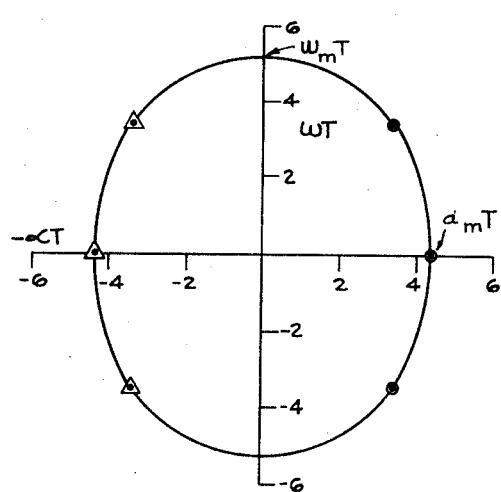
FIG_10_
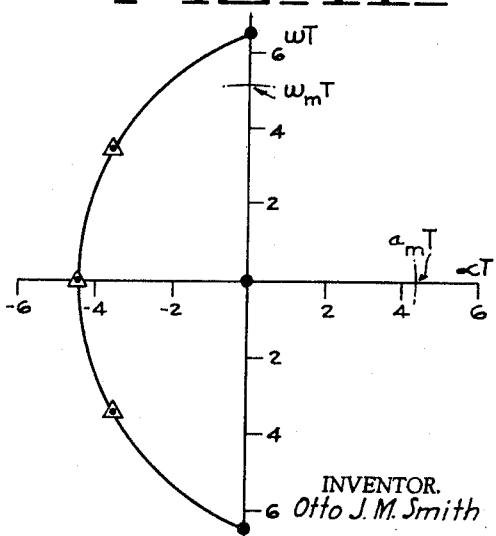
FIG_11_
INVENTOR.
*Otto J. M. Smith*
BY
ATTORNEYS July 21, 1964    O. J. M. SMITH    3,141,982
CONTROL SYSTEM FOR USE IN CONTROL OF LOOPS WITH DEAD TIME
Filed Jan. 6, 1960    6 Sheets-Sheet 4
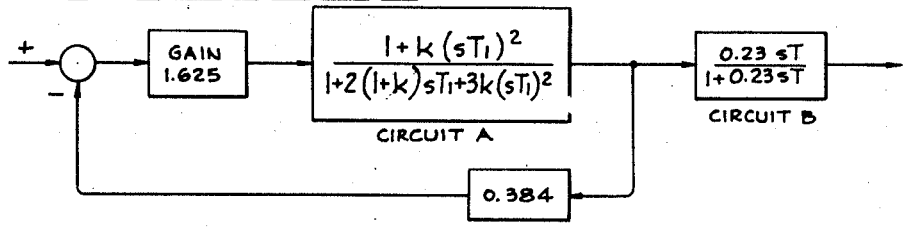
FIG_12_
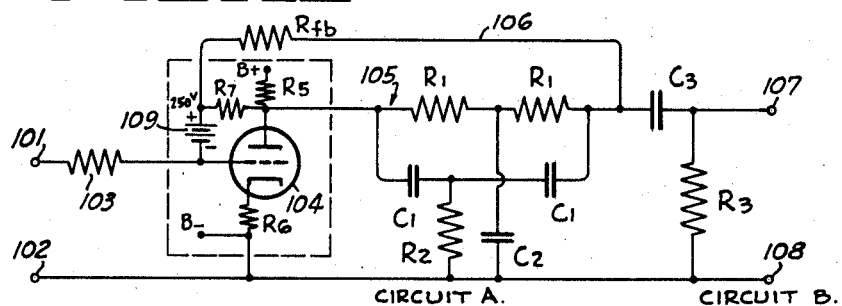
FIG_13
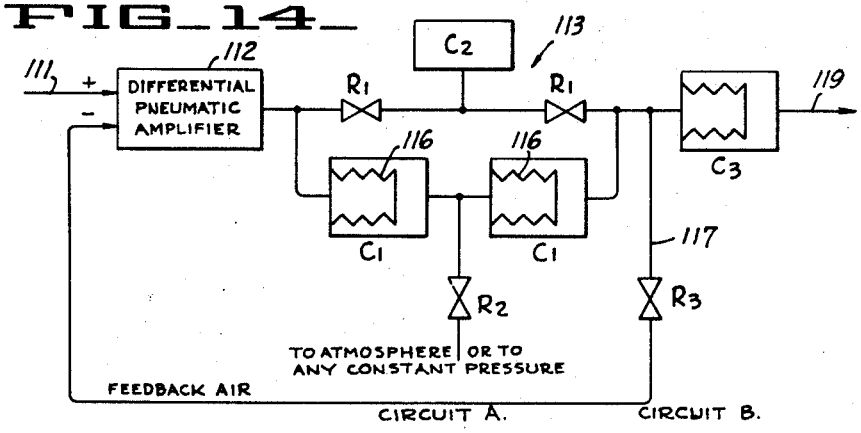
FIG_14_
INVENTOR.
Otto J. M. Smith
BY
ATTORNEYS

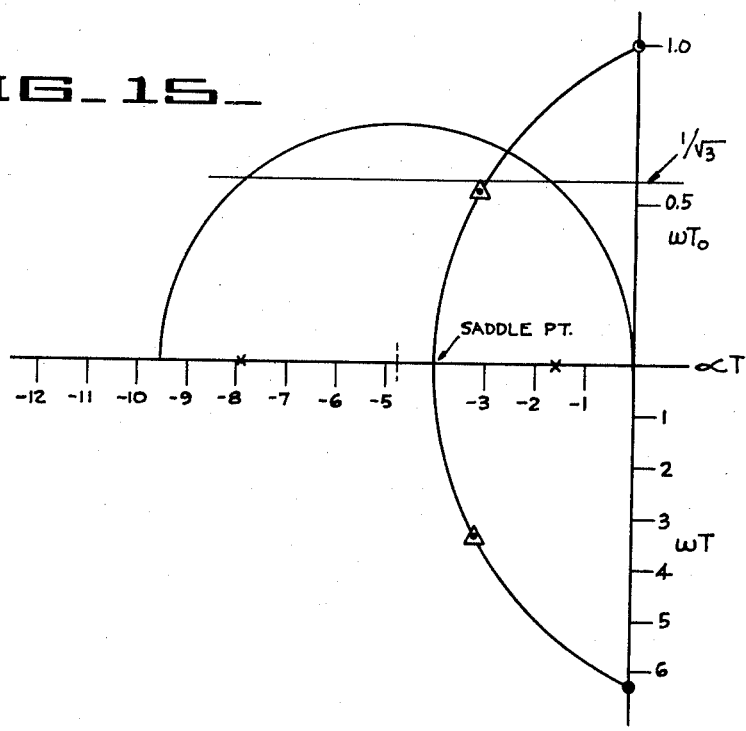
FIG_15_

INVENTOR.
OTTO J.M. SMITH

United States Patent Office 3,141,982
Patented July 21, 1964

3,141,982
CONTROL SYSTEM FOR USE IN CONTROL OF LOOPS WITH DEAD TIME
Otto J. M. Smith, 612 Euclid Ave., Berkeley, Calif.
Filed Jan. 6, 1960, Ser. No. 2,091
18 Claims. (Cl. 307—149)

This invention relates generally to a control system and method and more particularly to a control system and method for use in the control of loops with dead time.

A wide variety of control systems have transfer functions which include transportation lag or flow time which is normally called dead time. In the past, it has been difficult to stabilize loops containing dead time with the conventional proportional plus rate plus reset controllers. For a simple proportional controller, a rule-of-thumb for the permissible gain has been the ratio of the largest system time constant to the flow time. If the largest system time constant is relatively small, and the flow time is significant, then it is difficult to obtain high accuracy by virtue of a high loop gain.

In general, it is an object of the present invention to provide a control system and method for use in the control of loops having dead time in which the loop gain can be increased without diminishing stability.

Another object of the invention is to provide a system and method of the above character in which the loop gain is not limited by the dead time.

Another object of the invention is to provide a system and method of the above character in which oscillations excited by dead time are prevented.

Another object of the invention is to provide a system and method of the above character in which recovery time from an upset is reduced.

Another object of the invention is to provide a system and method of the above character in which a long dead time may be included within a control loop without adversely affecting the control loop.

Another object of the invention is to provide a control system and method of the above character in which a minor feedback loop is utilized which includes a function generator.

Another object of the invention is to provide a control system and method of the above character in which the function generator has a transfer function of approximately $1-\epsilon^{-sT}$.

Another object of the invention is to provide a control system and method of the above character in which the function generator has a transfer function whose pattern consists of zeros distributed at equal increments along the real frequency axis and poles in the left half of the $s$-plane located approximately on an elliptical locus and with approximately equal spacing in a vertical direction.

Another object of the invention is to provide a system and method of the above character in which the minor feedback loop makes possible an optimum minimum phase setting of the major feedback loop.

Another object of the invention is to provide a system and method of the above character in which the function generator has zero transmission at zero frequency and at least one real frequency.

Another object of the invention is to provide a system and method of the above character in which the function generator passes only high frequencies.

Another object of the invention is to provide a system and method of the above character in which the output of the minor feedback loop is the difference between the minimum phase model and an actual model with dead time.

Additional objects and features of the invention will appear from the following description in which the preferred embodiments have been set forth in detail in conjunction with the accompanying drawing.

Figure 17:
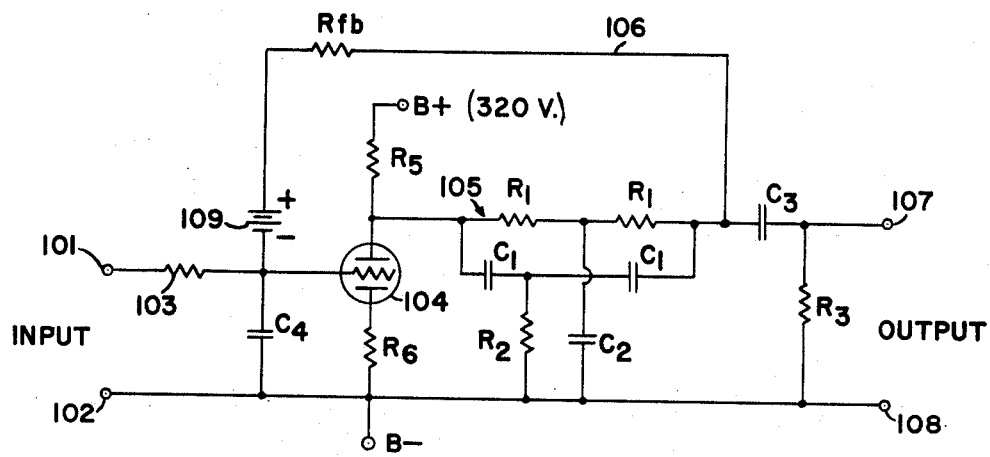

Referring to the drawing:
FIGURE 1 is a schematic diagram of a conventional flow type of viscosity blender;
FIGURE 2 is a schematic diagram of a flow type of viscosity blender incorporating a control system and method embodying my invention;
FIGURE 3 is a schematic diagram of a cold rolling mill incorporating a control system and method also embodying my invention;
FIGURE 4 is a curve showing the typical open loop transient response of a conventional control system which includes dead time;
FIGURE 5 is a block diagram of a conventional control system which includes dead time;
FIGURE 6 is a block diagram of the conventional system shown in FIGURE 5 with the dead times omitted and can be called a minimum phase analog of the actual process;
FIGURE 7 is a block diagram showing the optimum mode of action desired from the controller;
FIGURES 8 and 9 are block diagrams showing the derivation of the constructional arrangement of the controller by block diagram substitutions with FIGURE 9 showing the final system design;
FIGURE 10 shows the desired pattern for $\epsilon^{-sT}$ in the Laplace $s$-plane;
FIGURE 11 shows the desired pattern for $1-\epsilon^{-sT}$ in the Laplace $s$-plane;
FIGURE 12 shows a block diagram of a circuit which will produce a pulse function suitable for use in FIGURE 9;
FIGURE 13 shows a circuit diagram which is the electrical analog of the individual circuits in each block in FIGURE 12;
FIGURE 14 is a schematic diagram showing the pneumatic components which are the pneumatic analogs of the individual components of each block in FIGURE 12;
FIGURE 15 shows an $s$-plane plot of the open-loop twin-tee in circuit D of FIGURE 16 and root locus for the closed loop;
FIGURE 16 is a block diagram of a circuit which will produce a pulse function whose transference is the same as that shown in FIGURE 11; and
FIGURE 17 is a circuit diagram which is the electrical analog of the block diagram in FIGURE 16.

In general, my control system consists of means for producing a controlling response to maintain a desired characteristic of the medium being operated on substantially constant and means operating on the controlling response to anticipate the effect of dead time on the controlling response. The means for operating on the controlling response is a minor feedback loop which contains either memory devices or an analog of a dead time. The output of this minor feedback loop is the difference between a minimum phase model of the process or method which is utilized on the medium and a model of the actual process or method with dead time.

In FIGURE 1 of the drawing I have shown a schematic diagram of a conventional flow type of viscosity blender. As shown, the viscosity blender can be utilized for blending two or more liquids of different viscosities, the liquids of different viscosity being contained in reservoirs 11 and 12. For example, let it be assumed that reservoir 11 contains type A fluid and reservoir 12 contains type B fluid such as oils of different viscosities. The reservoirs are connected to pumps 13 and 14 by piping 16 and 17. The pumps are continuously driven by suitable means such as electric motors 18 and 19. The outputs of the pumps 13 and 14 are connected by piping 21 and 22 to a common mixing section 23 which discharges into a receptacle 24. Valves 26 and 27 are provided for controlling the flow through piping 21 and 22.

Fluid in the mixing section 23 is sampled by an automatic viscosimeter 28 through a connection 29 made near the discharge end of the mixing section 23. The output of the viscosimeter is connected to a controller 31 which controls the valve 27.

In a conventional application, the viscosity blender as shown in FIGURE 1 could be used for blending two types of oils with different viscosities to produce an end product at the discharge which has a particular desired viscosity. In the apparatus shown, the viscosity is measured automatically and the rate of flow of oil from the reservoir 12 is controlled by the automatic viscosimeter 28. This can be accomplished by setting valve 26 at one position and then automatically controlling the position of valve 27 to obtain the desired viscosity. If desired, both valves could be controlled by the controller 31 to obtain the desired viscosity.

The flow time required for flow of oil from the valves 26 and 27 after the valve 27 has been adjusted to correct for an error in viscosity until the new mixture reaches the point of sampling by the automatic viscosimeter is normally termed dead time or a time lag. As is well known to those skilled in the art, transportation lags and flow times are generally designated as dead times.

Another common type of dead time can be found in a cold rolling mill in which a roll is used for smoothing out variations in the thickness of an incoming sheet. An X-ray thickness gauge following the roll measures the sheet thickness and a controller adjusts the pressure of the roll to attempt to keep the thickness constant. The spacing between the rolls and the gauge which measures the effect of the pressure represents a dead time, the length of which is dependent upon the speed of the sheet.

It is well known that the negative feedback loop 32 represented by the automatic viscosimeter 28 and the controller 31 can be unstable when the flow time in the mixing section 23 is too great. However, the system charactersitics of the viscosity blender in FIGURE 1 can be greatly improved by introducing a power-actuated single point turbulent mixer rather than the mixing section 23. The measured resultant viscosity at this point is then used for a high gain proportional control which adjusts the high frequency transient characteristic of the valve 27. The flow distance is made as small as possible and the discharge viscosimeter is used only for the reset rate for the valve controller.

It has been found that even with the best possible piping system, there may be an excessive dead time between the valves and the discharge. A heat exchanger is another common component that may have an excessive dead time.

The open loop transient response of systems of this type is shown in the curve in FIGURE 4. The amount of dead time in any process or method can be determined from the step response, when operated with the manual control. Thus, if the control valve is given a small incremental change, the recorder controller 31 will plot an output transient curve somewhat like that shown in FIGURE 4. This curve 36 can be analyzed by drawing a line 37 tangent to the curve 36 at the inflection point where the slope of the curve is the steepest. From FIGURE 4 it can be seen that $T_a$ is the time encompassed by the tangent line 37 to the curve 36 between initial and final values. The intersection of the tangent line 37 and the initial value of the curve 36 occurs at time $T_b+T_d$ after the incremental change, where $T_d$ is the dead time. At this time the value of the actual curve 36 is designated as $a$. The line $b$ (parallel to the tangent line 37) through $g$ equals approximately $\epsilon a$ at time $T_d+T_b$ and parallel to the curve tangent line 37 is $T_b$ in advance of the curve tangent line in FIGURE 4. The dead time $T_d$ is the time from the instant of the initial incremental step change to the intersection of the line $b$ with the horizontal axis.

The two time constants of the system can also be determined from FIGURE 4. Let the factored values be $T_1$ and $T_2$ where $T_2$ is the smaller, and call $$x = T_2/T_1 \tag{1}$$

In FIGURE 4, divide $T_a$ into the two times $T_f$ and $T_c$ respectively before and after the tangency and inflection point.

It has been shown that:

$$T_c = T_1 + T_2 = (1+x)T_1 \tag{2}$$

$$T_a = \left(\frac{1}{x}\right)^{\frac{x}{1-x}} T_1 \tag{3}$$

and $$T_c/T_a = (1+x)x^{\left(\frac{x}{1-x}\right)} \tag{4}$$

To calculate values, it is convenient to use the following procedure: $g$ can be calculated approximately as $$g \cong a\left[\epsilon + \frac{0.53}{1+(150a)^{-3}}\right] \tag{5}$$

$T_b$ can be measured graphically or calculated as $$T_b = gT_a \tag{6}$$

The smallest time constant $T_2$ lies between $T_b$ and $(T_b+T_f)$ in value. It is approximately $$T_2 = T_b[1+10a+(\epsilon-1)(30a)^2] \tag{7}$$

When $a$ is more than 0.005, the time constant is approximately $$T_2 = (T_b+T_f)\left\{1-200(0.032-a)\left[1+\left(0.086+\frac{0.0015}{0.032-a}\right)^{-1}\right]^{-1}\right\} \tag{8}$$

The largest time constant $T_1$ is $$T_1 = T_c - T_2 \tag{9}$$

The inflection point is sometimes not well defined on the graph. To check $T_1$ and $T_2$, they can be substituted in Equations 1 and 3 to compare the calculated value of $T_a$ with the measured value. These two equations can be used for a regression method of calculating $T_1$ and $T_2$ if desired.

The transfer function of a system with this open loop transient response is given by $$G(j\omega) = \frac{k\epsilon^{-j\omega T_d}}{(1+j\omega T_1)(1+j\omega T_2)} \tag{10}$$

$$G(s) = \frac{k\epsilon^{-sT_d}}{(1+sT_1)(1+sT_2)} \tag{11}$$

The first of these is expressed as a ratio of the sinusoidal output vector of the process divided by the sinusoidal input vector. The second equation above uses the Laplace transform notation commonly used by those skilled in the art. The constant $k$ is the ratio of the total change of the output variable divided by the incremental change of the control valve. The optimum closed-loop control for systems of this type and embodying my invention is hereinafter described.

In FIGURE 2 is disclosed a viscosity blender of the type shown in FIGURE 1 which incorporates my control system and method. As shown in the drawing, my control system and method utilizes a minor high frequency loop 39 around the controller which includes a function generator 41. The output of the loop 39 is fed into an adder 42 as shown.

In FIGURE 3 I have disclosed a rolling mill which incorporates my control system and method. The sheet stock 44 is carried by a roll 46 and is fed to a plurality of stands 47, 48, 49, 51 and 52, onto a roll 53. The first stand 47 is utilized for smoothing out variations in the thickness of the incoming sheet from the roll 46. An X-ray thickness gauge 54 is mounted between stands 47 and 48 and measures the thickness of the sheet as it passes from the stand 47 and adjusts the pressure of the rolls in the stand 47 to attempt to keep the thickness of the sheet passing through the stand 47 relatively constant. The negative feedback loop 56, as shown, includes a controller 57. A minor feedback loop 58 is also utilized and feeds into an adder 59. The minor feedback loop includes a function generator 61. Changes in pressure in the first stand are propagated slowly as thickness changes through the entire system, therefore, the first stand is used primarily as a regulator, and not as a fine control. It will be appreciated that a relatively long dead time is inherent in apparatus of this type.

After the sheet is passed through the X-ray thickness gauge 54, it passes through the stands 48, 49, 51 and 52. After it passes the final stand 52, another X-ray thickness gauge 62 measures the final thickness of the sheet 55. The thickness at this point must be held within relatively close tolerances. As is well known to those skilled in the art, two methods are available for using the measured thickness to correct for thickness errors. For example, if the tension on the take-up roll 53 is increased, the thickness will diminish. Or, if the pressure in the final stand 52 is increased, the thickness will also diminish. In either case, the dead time is determined by the distance between the final stand 52 and the X-ray gauge 62 and the speed of movement of the sheet 55.

In FIGURE 3, the pressure of the rolls in the stand 52 as well as the tension on the take-up roll 53 is controlled by the X-ray thickness gauge 62. The X-ray thickness gauge, as shown, is connected to a negative feedback loop 63 which includes a controller 64. A minor feedback loop 66 is also provided and feeds into an adder 67. The minor feedback loop also includes a function generator 68.

In FIGURE 5, I have shown in block diagram form a conventional control system such as that shown in FIGURE 1. In the block diagram $\theta_i$ is the fixed set point from which is subtracted a signal proportional to the measured value of the output control variable which is designated as $\theta_o$. The block G represents a controller which amplifies this error and delivers a signal to a valve or pump in the system. The transfer function of the valve or pump and the system is grouped into two functions of frequency $G_1$ and $G_2$ and two dead times $T_1$ and $T_2$. The controller G is of a conventional type and has proportional plus rate plus reset control. The dynamic functions $G_1$ and $G_2$ have time constants which are of the same order of magnitude as the dead times $T_1$ and $T_2$. The blocks $G_1 \epsilon^{-sT_1}$ and $G_2 \epsilon^{-sT_2}$ represent the unalterable part of the system. $\theta_d$ represents the disturbances introduced into the system through an adder 71. The block F is the measuring device utilized for measuring or sampling the output from the system and produces a negative feedback signal $\theta_f$ which is introduced into an adder 72.

However, for the system shown in FIGURE 5, there is a maximum reset rate which cannot be exceeded without encountering stability difficulties.

The first step in designing a system in accordance with my method which can have either a much narrower proportional band or a much faster reset rate is to draw a block diagram of the system as it exists, omitting the dead times. Such a block diagram is shown in FIGURE 6. The block $G_1G_2$ represents the minimum phase process and the feedback signal $\theta_{mf}$ is generated by the measuring device F and is fed into an adder 73. Utilizing this block diagram as a basis for determining the controller settings, the block $G_3$ which is the reset rate, the proportional band, and rate adjustments is calculated to give the maximum speed of recovery from a disturbance and the closest possible control of the output variable $\theta_o$, within the limitation of stability.

The fictitious process hereinbefore described can be termed the minimum phase analog of the actual process and the controller setting $G_3$ can be called the optimum minimum phase control.

The next step in the method is to convert the block diagram in FIGURE 6 which is a statement of the optimum mode of control into a block diagram showing the physical arrangement of the components. FIGURE 7 is a block diagram giving a statement of the optimum mode of action desired of the controller $G_3$. The statement starts with the optimum minimum phase loop 74 shown in FIGURE 6. The output of this loop goes through the unalterable system dead time which is represented by the block $\epsilon^{-s(T_1+T_2)}$. Compensation for the unknown system disturbances is shown introduced into the feedback loop through an adder 76 and is represented by $G_2\epsilon^{-sT_2}\theta_d$.

The controller $G_3$ is unable to detect system disturbances $\theta_d$ instantly but must wait until the disturbance actually arrives at the system output, and changes the value of the controlled variable or detectable characteristic of the medium. For this reason, the disturbance $\theta_d$ has been delayed by the dead time $T_2$ before being introduced into the optimum minimum phase loop. This is a statement that the best that can possibly be done in the system is to bring the output to equal the set point $\theta_i$ in a time equal to the dead time of the system after the error has been measured.

A third statement is contained in FIGURE 7 which says that we can actually only measure the output variable and, therefore, we must operate with a negative feedback loop from this point. The negative feedback loop 77 has been introduced around the system as a whole through an adder 78 and a compensating positive feedback loop 79 has also been introduced through an adder 81 so that the optimum control which was postulated will not be disturbed. This, of course, is not the way the system will be built but is only a statement of the mode of action desired.

By means of block diagram substitutions, the constructional arrangement will now be derived. The outside negative feedback loop 77 in FIGURE 7 will be left unaltered. The positive feedback loop 79 will be "shrunk" in size until it coincides with the inner minor feedback loop 74, and then they are combined.

The first step is shown in FIGURE 8. First, $G_1$ and $G_2$ are moved after the branch point in FIGURE 7 so that they can be combined with the dead times in the manner in which they actually existed in the system as shown in FIGURE 5. This results in $G_1$ and $G_2$ also appearing in the inside minor feedback loop. Next the positive feedback loop 79 encompassing the entire system is changed from originating at the output $\theta_o$ to originate ahead of the disturbance $\theta_d$. This results in a minor loop with the transference $FG_2\epsilon^{-sT_2}$ as shown in FIGURE 8. The third step is to move the branch point for this loop from the output of the $T_1$ dead time to the input of the $T_1$ dead time. This results in a minor feedback loop transference of $FG_1G_2\epsilon^{-s(T_1+T_2)}$. Combining the two minor feedback loops results in the final system design as shown in FIGURE 9.

From FIGURE 9 it can be seen that the final system deviates from the optimum minimum phase control shown in FIGURE 6 through the addition of a single feedback loop from the output of the controller $G_3$ (before the control valve), back to the input of the controller at the point where the error between the set point $\theta_i$ and the measured variable is amplified. This minor feedback loop has for its main characteristic, the transfer function $1-\epsilon^{-s(T_1+T_2)}$. If the controller should deliver a step function, this step function would appear in the output of the minor feedback loop only for the time $T_1+T_2$, and then would disappear, there being no further signal passed. In effect, the minor feedback prevents overcorrection by passing a signal around the controller equal to the expected future value of the system output. The minor feedback loop, therefore, is a pulse generator which passes only high frequencies and does not pass any low frequencies such as D.C. By high frequency is meant any frequency above zero frequency. The minor feedback loop does not alter, in any manner, the precision of the system. It makes possible the settings of the controller $G_3$ exactly equal to their optimum minimum phase settings, even though the controller is operating on the actual system including long dead times. Also included in the minor high frequency feedback loop is a transfer function $FG_1G_2$, which is a miniature model of the minimum phase time-constant parts of the system.

Another way of describing this minor stabilizing loop is that it is the difference between two models of the actual process or method. One model is a minimum phase model including only the time constants, and the other model is the long dead time model including all of the parts of the process or method. The difference between these two models provides the appropriate stabilizing function for the controller.

In applying this method of control, any suitable reliable dead time model can be utilized which will produce the desired function such as the function $1-\epsilon^{-s(T_1+T_2)}$. For example, electrical transmission lines can be used to obtain delays of microseconds and electrical artificial transmission lines made up of inductances and capacitances can be used for delays up to fractions of a second. Magnetic tape recorders can be used where time delays of much greater length are required.

Strictly mechanical dead time components can also be utilized. For example, a string of pendulums coupled by springs may be utilized in certain applications. A very reliable small dead time component which can be utilized to produce the desired function consists of a rotating disc in which are placed a large number of pegs. The pegs can be shoved axially through the disc in accordance with an input signal and positions read by means of a mechanical feeler spaced in the path of the pegs away from the point where the input signal is applied. The reading would take place at a considerably later time dependent upon the mechanical input means and the mechanical feeler and depending upon the speed of rotation of the disc.

Suitable dead time components can also be designed for utilization in controlling a pneumatic process.

In designing components of this sort, which will produce the function of $1-\epsilon^{-s(T_1+T_2)}$ shown in the minor loop in FIGURE 9 with a minimum of complexity, I have found it desirable to use the techniques of network synthesis called the potential analog method. FIGURE 10 shows the Laplace s-plane pattern of the poles and zeros of a transference $\epsilon^{-sT}$ which is the best possible approximation to a dead time. In FIGURE 10 I have chosen only three poles and three zeros, however, if desired, this same method may be applied to any number of poles and zeros. As the number is increased, the number of cycles of oscillation which can be stored in the dead time is correspondingly increased.

In proceeding with the design, the dead time is designated as T. The number of poles designated as $\triangle$ and the number of zeros designated as $\odot$ are each equal to n. These poles and zeros will lie on an ellipse in the s-plane which has a ratio of $a_m$ to $\omega_m$ of r. For an optimum wave shape of the step transient through this dead time with rapid rate of rise without many oscillations, a good rule-of-thumb is that $$r = 5/2n \qquad (12)$$

The phase lag per pole-zero at the maximum useful frequency $\omega_m$ is $$\frac{\phi_m}{n} = \frac{\pi}{1+r} = \frac{\pi}{1+5/2n} \qquad (13)$$

The dead time and the number of poles is then selected and the ratio of the minor to the major axis of the ellipse, r, is calculated from the above. The maximum possible phase lag in the useful frequency band is then calculated. This is $$\phi_m = \frac{n\pi}{1+r} = \frac{n\pi}{1+5/2n} \qquad (14)$$

The useful frequency band is given by the maximum frequency for which this s-plane pattern is a good approximation to a dead time. This is $$\omega_m = \frac{\phi_m}{T} = \frac{n\pi}{T(1+r)} = \frac{n\pi}{T(1+5/2n)} \qquad (15)$$

The horizontal intercept of the ellipse in FIGURE 10 is then $$a_m = r\omega_m = \frac{5\pi}{2T(1+5/2n)} \qquad (16)$$

The vertical values of the position of the poles and zeros are multiples of $2\omega_m/n$. These are $$\omega_P = \pm 2\omega_m k/n \qquad k=1, 2, 3, \text{etc.} \qquad (17)$$

The horizontal coordinates of the poles and zeros in FIGURE 10 are given by $$\omega_P^2 + \left(\frac{a_P}{r}\right)^2 = \omega_m^2 \quad a_P \cong a_m\sqrt{1-\frac{4k^2}{n^2}} \qquad (18)$$

If the maximum frequency of the good approximation is not high enough, or if the minimum phase lag available in the useful frequency band is not high enough, then a larger number of poles and zeros must be chosen. For many process controls, however, a pattern of three poles and three zeros is far superior to the six-time-constant approximation, and therefore this should be adequate.

The component to be built in the controller is not the dead time $\epsilon^{-sT}$ but is the function $1-\epsilon^{-sT}$. This function shown in FIGURE 11 can be derived from the pattern in FIGURE 10 by noting that the dead time and the function both have the same poles. That is, the same values of s will make each function go to infinity. The zeros of the function, however, are different. The zeros of the pulse function are equal to the roots of $1-\epsilon^{-sT}=0$. This is true when $\epsilon^{-sT}=1$. These values can be found in FIGURE 10 as the locations of the intersections of the zero-db contours and the zero-degree phase lines. The zero-db contour is the vertical $\omega$ axis and all of the zeros of the pulse function will, therefore, lie in the vertical $\omega$ axis. The frequencies at which the zeros occur are given by the frequencies for multiples of $2\pi$ phase shift in the original transfer function for the dead time. Solving for these frequencies directly from the dead time, they are: Read frequencies of $2\pi$ phase shift, $$\omega = 2\pi k/T = \pm\left(1+\frac{5}{2n}\right)\left(\frac{2}{n}\omega.k\right)$$
$$= \left(1+\frac{5}{2n}\right)\omega_P$$

For the specific pattern shown in FIGURE 11 the zeros are at $$\pm\frac{6.28}{T}$$

radians per second and the poles are at $$-\frac{3.2}{T}$$

for $\alpha$ and at $$\pm\frac{3.42}{T}$$

for $\omega$. The pole on the real axis is at $$-\frac{4.29}{T}$$

A suitable pulse function can be constructed electrically by a circuit diagram whose block diagram is shown in FIGURE 12. The equations for each of the blocks are shown in the blocks. The parallel network in circuit A generates the two complex zeros shown on the ω axis in FIGURE 11. Circuit A with the feedback amplifier designated by the block 0.384 generates two poles different from those shown in FIGURE 11. Circuit B generates the origin zero and the real pole shown in FIGURE 11. In the formula given in Circuit A, $k=2.8$ and $T_1=T_0/\sqrt{k}=T/2\pi\sqrt{k}$. The overall loop gain is equal to 0.625.

The electrical analog of the individual circuits in each block of FIGURE 12 is shown in FIGURE 13 with the design parameters necessary for the circuits to produce the desired pulse function.

The electrical analog consists of input terminals 101 and 102 which can be connected to the output of the controller 57 or the circuit 58 shown in FIGURE 3. The input lead 101 is connected to one side of a grid resistor 103 and the other sideof the grid resistor 103 is connected to the grid of a suitable amplifying means such as the triode 104 as shown. The triode 104 consists of conventional plate, grid and cathode elements. The cathode element is connected to the ground lead 102 through a resistance $R_6$ which represents the cathode bias resistance of the tube 104. The grounded end of the bias resistor is connected to the B-terminal of the plate voltage supply. The plate element is connected through a resistance $R_5$ which represents the plate load resistance of the tube 104 to the B terminal of a plate voltage supply. It is also connected to a resistance $R_7$ which represents the plate to grid feedback resistance of the tube 104. The resistance $R_7$ is connected to the positive terminal of a battery 109 which prevents D.-C. current. The negative terminal is connected to the grid of the tube 104. The plate element is also connected to a parallel network 105 which consists of a pair of a pair of serially connected resistors designated $R_1$ and a capacitor $C_2$ connected between the centerpoint and the ground lead 102. The resistors $R_1$ are connected in parallel with a pair of serially connected capacitors designated as $C_1$. A resistor $R_2$ is connected between the ground lead 102 and the centerpoint between the two capacitors $C_1$. The values of the capacitors $C_1$ and the resistance $R_2$ are such that only high frequencies are passed through this leg of the parallel network.

The output of the network 105 is fed through a feedback circuit which consists of a conductor 106, a resistor $R_{fb}$, and a series battery 109 to the grid of the triode 104. This forms a closed loop which causes generation of two s-plane complex poles which are needed in the pulse function. The output of the network 105 is also connected to the output terminal 107 through a capacitor $C_3$. A resistance $R_3$ is connected between the output terminal 107 and the conductor 102. The conductor 102 is connected to terminal 108. The value of the capacitor $C_3$ is such that only high frequencies are passed.

The output terminals 107 and 108 of the pulse function generator as shown in FIGURE 13 are connected into the error input of the controller. Suitable apparatus well known to those skilled in the art may be utilized for the controller. For example, if my function generator is utilized in conjunction with the rolling mill shown in FIGURE 3, the output of the function generator could be fed into suitable motor control apparatus such as that of the type manufactured by Ward-Leonard. In such a system, the pressure of the rolls would be varied by the controller in accordance with the output from the controller as affected by the function generator.

The design parameters of the various components in FIGURE 13 are as follows:

$$R_2 = k\frac{R_1}{2}$$

$$C_2 = k2C_1$$

For Circuit A:

$T_1 = R_1 C_1$ $T_0 = T_1\sqrt{k} = T/2\pi$ $k = 2.8$

Loop gain $= 0.625$

For Circuit B:

$T_3 = R_3 C_3 = 0.23T$

The parameters for a typical function generator following the design in FIGURE 13 for a flow time of 27 seconds are:

$R_1$—320 kilohms $R_2$—450 kilohms $R_3$—3.1 megohms $R_{fb}$ (with series battery)—4.0 megohms Resistor 103—1.55 megohms ($R_5$) Plate load resistance of tube—11 kilohms ($R_6$) Cathode bias resistance of tube (not bypassed)— 890 ohms ($R_7$) Plate-to-grid feedback resistance of tube (with series battery)—8.7 megohms $C_1$—8 microfarads; $C_2$—45 microfarads; $C_3$—2 microfarads Triode 104, Type No. RCA 6J5, operated at 350 volts plate supply, 250 volt plate voltage, 8 volts cathode bias, and 9 ma. plate current.

It is readily apparent that the electrical pulse function generator shown in FIGURE 13 can be utilized in many applications. All that is required is that the means for detecting or sensing the characteristic of the medium which is being measured have an electrical output. Many of such devices are presently on the market and are well known to those skilled in the art and hence are not described in detail. The same is true for the controller which may be electro-mechanical apparatus whose output is effected or operated upon by the function generator. Thus, the controller can be of a type which converts an electrical signal or pulse into mechanical operations such as varying the pressure on rolls in a stand in a rolling mill, controlling the speed of rotation of a motor, opening a valve and the like.

The pneumatic analog for the block diagram in FIGURE 12 is shown in FIGURE 14. The output of the controller 31 which may be in any suitable form such as actuating air pressure for a control valve is applied to the input line 111 which feeds into a differential pneumatic amplifier 112 of a type well known to those skilled in the art. The pneumatic amplifier feeds into a parallel network 113 which is often termed a twin-T, or sometimes a parallel-T. The twin-T consists of one branch or passage with two variable orifices connected in series and designated as $R_1$, and a fixed capacity designated as $C_2$ connected to the centerpoint. Another branch or passage is in parallel with the aforedescribed branch and consists of two double ended capacities connected in series and designated as $C_1$. The double ended capacities are of a type well known to those skilled in the art and consist of a fixed capacity which is separated into two parts by a very low spring constant Sylphon bellows 116. The path provided by the pair of capacities $C_1$ passes only high frequencies. The center or common point between the capacities $C_1$ feeds into a variable orifice which is designated as $R_2$ and which bleeds to atmospheric pressure. Thus, it can be seen that only sudden changes in in pressure will be transmitted through this parallel branch consisting of the capacities $C_1$ and the orifice $R_2$.

The output of the twin-T 113 is fed through a branch or passage 117, which includes an orifice designated as $R_3$, back to the differential pneumatic amplifier 112 as shown. This causes the closed loop to generate two s-plane complex poles which are needed in the pulse function. The output of the twin-T 113 is also connected to the error input of the conventional controller through another double ended capacity designated as $C_3$ which passes only high frequencies or sudden transient changes.

The output of the device shown in FIGURE 14 can be either in the form of air pressure or a mechanical output linkage well known to those skilled in the art. The output linkage can be used as a fulcrum in the error computation at the set point of the pneumatic controller. If the output is in the form of air pressure, the air pressure can be introduced directly into a force-balance controller.

In general, conventional types of apparatus may be utilized for connecting the pneumatic function generator as shown in FIGURE 14 to the controller utilized in the apparatus or process. Such apparatus is well known to those skilled in the art and will not be described in detail. For example, if temperature is being measured, a conventional temperature to pressure transducer can be utilized. If the viscosity of a liquid is being measured, a viscosity to pressure transducer can be utilized. Different types of controllers can be also utilized in conjunction with my function generator. For example, it may be desirable to utilize a jet type of rate controller manufactured by the Taylor Instrument Corp.

To represent the $FG_1G_2$ function in FIGURE 9, additional phase lag components made of orifices and capacities may be placed on the output of the network in FIGURE 14.

The mechanism of generation of the pulse function by the circuit in FIGURE 13 is as follows: Circuit B produces a zero at the origin of the $s$-plane and a pole on the negative real axis of the $s$-plane at $-4.5$. These are shown in FIGURE 11 by a circle and a triangle respectively. This alone is an exponential pulse generator. Circuit A in FIGURE 13 has one real frequency for which it acts like a balanced bridge, and has zero output for a finite input. The transference therefore has two zeros on the imaginary axis of the $s$-plane, at plus and minus $j\,6.28$. These two zeros are also the same as those shown in FIGURE 11 by two circles. Circuit A in FIGURE 13 also produces two real poles. These circuit poles are located at $$sT_1 = -\frac{1+k}{k} \pm \sqrt{\left(\frac{1+k}{k}\right)^2 - \frac{1}{k}}$$

or at $$sT = 2\pi\left(-\sqrt{k} - \frac{1}{\sqrt{k}} \pm \sqrt{k+1+\frac{1}{k}}\right)$$

For $k$ equal to 2.8, the parameter value chosen, the open loop circuit poles are at $sT_1$ of $-0.146$ and $-2.566$, or at $sT$ of $-1.5$ and $-26.4$. The feedback in FIGURE 12 around circuit A changes these open loop poles into two different closed loop poles. With the loop gain of 0.625 shown in FIGURE 12, the closed loop poles occur at $sT$ of $-2.5$ and $-15.1$. These are not complex poles as shown in FIGURE 11, but their phase contribution at $\omega_m T$ is similar to that of the complex poles, and consequently the step response of the entire system in FIGURE 12 is approximately a pulse of length T, and unit height.

It is within the scope of this invention to vary the loop gain and $k$ to control the wave shape of the step response of the pulse generator. By way of example, the parameters in FIGURE 12 can be altered to be $k$ of 2.8, forward gain of 3.23, feedback gain of 0.69, loop gain of 2.23, and the complex poles of the closed loop will be at $sT$ of $-4.4 \pm j\,3.4$. This is also an acceptable pulse function. By way of another example, $k$ can be 1.0, the forward gain 2.8, the feedback gain 0.65, the loop gain 1.84, and the closed loop poles will again be at $-4.4 \pm j\,3.4$. This last adjustment is for the minimum possible amplifier gain to cause the closed loop poles to have the same vertical coordinates as the complex poles shown in FIGURE 11.

Circuit B adds the origin zero and the real pole in FIGURE 11. It should be noted that circuit B is a high-pass filter, and significantly attenuates the low frequency components. It is, therefore, not important that either the input or the output to the minor feedback loop in FIGURE 12 have good low frequency characteristics.

The coefficients have now been determined for the devices or function generators in FIGURES 13 and 14. The output from the parallel network has complex zeros exactly on the $\omega$ axis which can be adjusted by driving it with a sinuosidal input and adjusting the R.C. ratio until there is one frequency for which the output is perfectly zero or motionless. The frequency can be adjusted by varying the R.C. product which will move the zero in FIGURE 14 in a vertical direction.

The damping and the frequency of the closed-loop poles can be adjusted by varying $k$, and the gain of the amplifier in FIGURES 13 and 14. The purpose of the feedback attenuator in FIGURE 12 is to permit the adjustment of the loop gain independently from the adjustment of the level of output to the controller. The pole characteristics can be measured by transient decrement tests, using a square wave input to the devices in FIGURES 13 and 14. Circuit B in FIGURE 12 is designed as a high-pass filter to deliver each change at its output, either as air pressure or as a mechanical output linkage. This output linkage can be used as a fulcrum in the error computation at the set-point of the pneumatic controller. Or the air pressure can be introduced directly into a force-balance controller.

Although the pulse function generator shown in block diagram form in FIGURE 12 and the electrical analog shown in FIGURE 13 provides a satisfactory pulse function, an improved pulse function can be obtained from the pulse function generator shown in FIGURE 16 and its electrical analog shown in FIGURE 17. The equations for each of the blocks are shown within the blocks. Circuit D in FIGURE 16 serves the same purpose as circuit A in FIGURE 12 and generates two complex zeros. Circuit E in FIGURE 16 is identical to circuit B in FIGURE 12. Circuit C in FIGURE 16 comprises an additional lag network. It will be noted from the block diagram of FIGURE 16 that the forward and feedback gains are different from the corresponding values in FIGURE 12.

The electrical analog of the pulse function generator is shown in FIGURE 17. This electrical analog is very similar to the circuit shown in FIGURE 13 with the exception that it includes an additional capacitor $C_4$ connected between the grid of the tube 104 and the B minus terminal. The table below gives the parameters which influence transferences in each block:

| Figure 16 | Figure 17 |
| --- | --- |
| Circuit C numerator. | $R_5$, Resistor 103, $R_{fb}$ and gain of tube 104. |
| Circuit C denominator. | Resistor 103, $R_{fb}$ and capacitor $C_4$. |
| Circuit D. | $R_1$, $R_2$, $C_1$, $C_2$. |
| Circuit E. | $R_3$, $C_3$. |
| Feedback gain of 0.62. | Resistor 103 and Resistor $R_{fb}$. |

In one embodiment of the function generator shown in FIGURE 17, the values of the parameters were as follows:

| | | |
| --- | --- | --- |
| Resistor $R_1$ | megohms | 0.32 |
| Resistor $R_2$ | do | 0.45 |
| Resistor $R_3$ | do | 3.1 |
| Resistor $R_5$ | ohms | 11,000 |
| Resistor $R_8$ | do | 720 |
| Resistor 103 | megohms | 3 |
| Resistor $R_{fb}$ | do | 2 |
| Capacitor $C_1$ | microfarads | 8 |
| Capacitor $C_2$ | do | 45 |
| Capacitor $C_3$ | do | 2 |
| Capacitor $C_4$ | do | 2.14 |
| B+ | volts | 320 |

Voltage from battery 109 _____ do____ 220
Tube 104 _____ Type 6J5
Bias _____ volts__ 6.5
Current _____ milliamperes__ 9

The poles and zeros in the sT plane produced by the circuits C, D and E in the block diagram in FIGURE 16 are tabulated below:

| Circuits | Poles in sT | Zeros |
|---|---|---|
| C | −10.5 | |
| D | −1.5 and −27 | + and −j 6.28. |
| E | −4.4 | Origin, 0. |
| Closed loop | −3.2+j 3.42 and −3.2−j 3.42 | + and −j 6.28. |

The actual mechanics of the generation of the pulse function in the diagram shown in FIGURE 16 is best explained by reference to FIGURE 15. The figure shows the s-plane plot of a circuit similar to circuit D in FIGURE 16. In the drawing in FIGURE 15 x designates open loop poles
△ designates closed loop poles at 0 db and 180°
⊙ designates open loop and closed loop zeros The parallel network D has two complex zeros marked with circles, one real pole marked with a cross at −1.5, and another pole at −27 which is not shown. Network C contributes a real pole at −10.5.

The next step is to generate the complex poles shown in FIGURE 11. These are generated by closing a negative feedback loop around networks C and D with a small amount of attenuation. This produces closed loop poles at the locations of the triangles. In order that the function generator shall have unity steady-state gain and deliver a pulse of unit height for a step input of unit height, the gain of the amplifier includes in addition compensation for the feedback factor.

The closed loop in FIGURE 16 has a root locus similar to that shown in FIGURE 15. FIGURE 16 has three poles in the open loop, at 1.5, 10.5, and 27 on the negative real axis. The effect of the combination of the two poles at 10.5 and at 27 is the same as a single pole at 7.9 on the negative real axis with respect to the phase shift in the vicinity of the closed loop pole in FIGURE 15. The closed loop in FIGURE 16 therefore generates complex poles at the locations specified as optimum in FIGURE 11. Circuit E in FIGURE 16 produces the origin zero and the pole at −4.4. FIGURE 16 therefore poduces a pulse function whose transference is the same as that shown in FIGURE 11.

It is apparent from the foregoing that the control system and method herein described depends upon the use of a minor feedback loop containing either memory devices or an analog of a dead time. The minor feedback loop passes only high frequencies the output of which is the difference between a minimum phase model of the process and a model of the actual process with dead time.

It is also apparent from the foregoing that I have provided a new control system and method which makes possible the inclusion of long dead times within a control loop. At the same time high loop gains can be maintained with great precision without sacrificing stabililty and without overshoot.

This is a continuation-in-part application of my copending application Serial No. 702,064, filed December 11, 1957, and now abandoned.

I claim:

1. In a control system wherein operating means continuously performs an operation on a medium, the operation being subject to control whereby a detectable characteristic of the medium is thereby varied, means responsive to variations in the said characteristic of the medium to provide a controlling response, there being a time lag between said response and the operational control effecting the same, means for controlling said operation in accordance with said controlling response whereby the system can maintain said characteristic substantially constant, and compensating means operating on said controlling response to anticipate the effect of the time lag on the controlling response, said compensating means including a function operator having a transfer function related to the difference between the minimum phase analog and the actual phase analog of the operation, said actual phase analog having a gain proportional to the gain from the said operational control to the said controlling response, said actual phase analog having, a phase equal to the phase from the said operational control to the said controlling response, said minimum phase analog having a gain proportional to the gain from the said operational control to the said controlling response, and said minimum phase analog having the minimum possible phase lag corresponding to the said gain characteristic of the said minimum phase analog.

2. In a control system, a control loop having a transfer function which includes dead time, the loop including operating means which continuously performs an operation on a medium, the operation being subject to control whereby a detectable characteristic of the medium is thereby varied, means responsive to variation in the said characteristic of the medium to provide a controlling response, there being a dead time between said response and the operational control effecting the same, means for controlling said operation in accordance with said controlling response whereby the system tends to maintain said characteristic substantially constant, and compensating means operating on said controlling response to anticipate the effect of the dead time in the loop, said compensating means generating a component which predicts the value of the controlling response unaffected by dead time.

3. A system as in claim 2 wherein said last named compensating means consists of a minor feedback loop, the minor feedback loop providing an additional controlling response which is utilized for generating said first named controlling response.

4. In a control system of the type which follows an input, a control loop having a transfer function which includes dead time, the control loop including operating means which continuously performs an operation on a medium, the operation being subject to control whereby a detectable characteristic of the medium is thereby varied in accordance with the input, means responsive to variations in the said characteristic of the medium to provide a controlling response, there being a dead time between said response and the operational control effecting the same, a controller for controlling said operation in accordance with said controlling response whereby the system tends to maintain said characteristic substantially constant relative to the input, and an additional control loop, the additional control loop including a function generator, said function generator being responsive to the output of the controller, the output of the function generator providing an additional controlling response which is combined with the input to the controller, said additional controlling response being substantially equal to the difference between a prediction of the value of the controlling response with the dead time removed and a prediction of the value of the controlling response with the dead time retained.

5. A control system as in claim 4 wherein said function generator has a transfer function of approximately $$1 - \epsilon^{-s(T_1+T_2)}$$

6. A control system as in claim 4 wherein said function generator has a Laplace transform transfer function of gain consisting of a plurality of zeros of gain for multiples of a predetermined frequency of the said operational control and gain resonances for other frequencies of the said control described by poles in the left half of the s-plane located approximately on an elliptical locus and with approximately equal spacing in a vertical direction.

7. A control system as in claim 4 wherein said function generator has zero transmission at a gain such that when said output of the controller is constant at zero frequency, the said output of the function generator is zero, and when said output of the controller is a constant amplitude sine wave of predetermined frequency the said output of the function generator is zero.

8. A control system as in claim 4 in which the transfer function of the function generator is approximately equal to the difference between a first analog of the said operation being controlled and a second analog, said first analog having an input-to-output gain characteristic as a function of frequency proportional to the gain of the said operation being controlled, said first analog having an input-to-output phase characteristic as a function of frequency equal to the phase of the said operation being controlled, said second analog having an input-to-output gain characteristic equal to the said gain of the said first analog, and said second analog having the minimum possible phase lag corresponding to the said gain of the said first analog.

9. In a control system of the type which follows an input and wherein operating means continuously performs an operation on a medium, the operation being subject to control whereby a detectable characteristic of the medium is thereby varied in accordance with the input, means responsive to variations in the said characteristic of the medium to provide a controlling response, there being a time lag between said response and the operational control effecting the same, means including a controller for controlling said operation in accordance with said controlling response to maintain said characteristic substantially constant relative to the input, the time lag being characterized by a non-minimum phase transference and compensating means fed from the output of the controller and fed into the input of the controller to anticipate the effect of the time lag on the controlling response, said compensating means generating an additional controlling response including a component having a value substantially equal to the difference between a prediction of the value which the controlling response would have with a computer transference, said computer transference having the same gain characteristic as the said non-minimum phase transference and said computer transference having the minimum possible phase lag corresponding to the said gain characteristic having the same gain characteristic as the non-minimum phase transference.

10. A control system as in claim 9 wherein said compensating means includes a function generator which has a Laplace transform transfer function of gain consisting of zeros of gain at equal increments of real frequency and gain resonances described by poles in the left half of the s-plane located approximately on an elliptical locus and with approximately equal spacing in the real frequency coordinate.

11. A control system as in claim 10 wherein the function generator includes a parallel network which consists of a common ground, a pair of serially connected resistors, a capacitor connected between the center point of the serially connected resistors and the common ground, a pair of serially connected capacitors connected in parallel with the serially connected resistors, and a resistor connected between the center point of the serially connected capacitors and the common ground.

12. A control system as in claim 11 wherein said function generator also includes an amplifier the output of which feeds into the network, together with a feedback circuit which connects the output of the network to the input of the amplifier, the feedback circuit completing a closed loop to cause generation of the said gain resonance.

13. A system as in claim 12 wherein said function generator includes a capacitor which is connected to the output of the network, said last named capacitor serving only to pass high frequencies.

14. A control system as in claim 10 wherein said function generator is of the pneumatic type and includes a network which consists of one branch having two orifices connected in series and a fixed capacity connected to the center point between the two orifices, and another branch in parallel with said first named branch and consisting of a pair of serially connected double ended capacities, and an orifice connected to the center point between the two serially connected double ended capacities and discharging to a constant pressure.

15. A system as in claim 14 wherein said function generator includes a differential pneumatic amplifier the output of which feeds into the input of said network, together with a feedback branch, the output of the network being connected to the feedback branch and being fed through the feedback branch into the differential amplifier, the feedback branch completing a closed loop to cause the generation of s-plane complex poles.

16. A system as in claim 15 wherein said function generator includes a double-ended capacity connected to the output of the network.

17. In a control system of the type having a controller acting upon an input command signal and performing an operation to produce a system output that is substantially a specified function of the input command signal, means responsive to variations in the output to provide a feedback signal to said controller, there being a time lag between the system output and the operation effecting the same, means for subtracting said feedback signal from the input to the controller, and minor feedback means responsive to the output of the controller, said minor feedback means including a component having a transfer function approximately equal to $1-\epsilon^{-s(T_1+T_2)}$, and means connecting said minor feedback means to the input of the controller so that its output is subtracted from the input to the controller.

18. In a control system of the type having a controller, an input command signal, and a controlled process, said process having a controlling variable and a useful output, means for measuring the said useful output, said process being characterized by a transference with gain and non-minimum phase, said gain being equal to the amplitude of said measured useful output divided by the amplitude of said controlling variable when said controlling variable is sinusoidally perturbed, said nonminimum phase being equal to the phase of said measured useful output less the phase of the said controlling variable when said controlling variable is sinusoidally perturbed, said nonminimum phase being more negative than the minimum possible phase lag for any linear system having the said gain, means for combining said input command signal, said measured output and the output of said computer, means for energizing the input of said controller with a combination, a computer, and means for connecting the output of said controller to the input of said computer, said computer having means for generating said controlling variable from the output of said controller, said computer having a transfer function equal to the difference between said transference and a minimum-phase transference, said minimum-phase transference having said gain, and said minimum-phase transference having said minimum possible phase lag.

References Cited in the file of this patent
UNITED STATES PATENTS

| | | |
|---|---|---|
| 2,801,351 | Calvert | July 27, 1957 |
| 2,825,825 | Smoot | Mar. 4, 1958 |
| 2,829,322 | Silva | Apr. 1, 1958 |